United States Patent [19]

Kim

[11] Patent Number: 4,962,821

[45] Date of Patent: Oct. 16, 1990

[54] DISCRETE DRIVE SYSTEM FOR A SKID STEER LOADER

[75] Inventor: Jong R. Kim, Incheon, Rep. of Korea

[73] Assignee: Daewoo Heavy Industries Ltd., Rep. of Korea

[21] Appl. No.: 327,347

[22] Filed: Mar. 22, 1989

[51] Int. Cl.$^5$ .................... B62D 11/04; F16H 57/02; F16D 49/00

[52] U.S. Cl. .................. 180/6.48; 74/606 R; 74/665 GE; 180/242; 180/246

[58] Field of Search .................. 180/6, 48, 242, 245, 180/246; 188/77 R; 74/665 GE, 606 R

[56] References Cited

U.S. PATENT DOCUMENTS

| | | | |
|---|---|---|---|
| 3,198,551 | 8/1965 | Garner | 180/6.48 X |
| 3,635,365 | 1/1972 | Bauer | 180/6.48 X |
| 3,895,728 | 7/1975 | Heggen | 180/89.12 X |
| 4,168,757 | 9/1979 | Mather et al. | 180/6.48 |

*Primary Examiner*—Allan D. Herrmann

*Attorney, Agent, or Firm*—Michael N. Meller

[57] ABSTRACT

The present invention is directed to a discrete drive system for a skid steer loader comprising a pair of independent transmission cases interconnected by a plate member at a spaced relationship. The transmission cases enclose chain and sprocket drives for the loader and have the axle housings outwardly extending from the outer side walls thereof. A pair of gear reduction means are mounted on the inner side walls of the transmission cases to provide a drive power to the front and rear stub axles at reduced speeds. The gear reduction means incorporates an improved brake device including a circular drum secured to the reduction gear, a flexible band wound around the drum and an eccentric cam shaft for actuation of the brake device. Coupled to the gear reduction means are a pair of hydrostatic motors having output shaft extending into the outer casings of the reduction means. Each of the output shafts has a tapering shape and terminates at its threaded end to facilitate the mounting of the pinion gear.

12 Claims, 3 Drawing Sheets

DISCRETE DRIVE SYSTEM FOR A SKID STEER LOADER

FIELD OF THE INVENTION

The present invention pertains generally to a skid steer loader and more particularly to an improved drive system for the skid steer loader.

DESCRIPTION OF THE PRIOR ART

A skid steer loader is a vehicle possessing a high degree of maneuverability and capable of low clearance applications. It is propelled and maneuvered by driving the wheels on one side of the vehicle at a different speed and/or in a different direction from those on the other side so as to achieve a turning motion on its own axis.

It is well known in the art that a skid steer loader is provided with a main frame comprising a center compartment partially defined by a pair of longitudinally extending, laterally spaced side beams. Adjacent to the rear portion of the frame, an engine for the loader is located for generating power to drive the loader. A bucket is disposed at the front of the loader and a manipulating unit is mounted on the top of the frame to constitute a part of the loader. Bolted to the side beams is an elongated transmission case containing therein a plurality of sprockets and endless chains adapted to operatively connect the sprockets in a conventional manner.

It has also been proposed to provide an intermediate gear reduction mechanism in the drive system into which an hydrostatic motor can be coupled to produce desired torques and speeds.

U.S. Pat. Nos. 3,635,367 and 3,895,728 disclose a drive system for the loader comprising reduction gear units which are adapted to cause the rotational speed of the hydrostatic motor to be reduced, thereby increasing the torque applied to the front and rear axles. In the afore-mentioned patents, substantial increase in torque can be achieved by providing reduction gear units; however, it still remained desirable to meet the load capacity requirement without sacrificing the low vehicle profile.

U.S. Pat. No. 4,168,757 issued to Mather et al on Sept. 25, 1979 teaches a drive system wherein a pair of reduction gear units are placed on the opposite side walls of an elongated transmission case containing therein sprockets and chains for use in power transmission. The arrangement disclosed in the Mather patent is said to have the advantages of an easier access to the elements constituting the drive system whenever replacement or repair is necessary and of a higher load capacity.

However, when such an arrangement as disclosed in the Mather patent is employed with the skid steer loader, low vehicle profile would be no longer obtainable because essential components such as an engine, a hydraulic pump or manipulating units are to be located on the transmission case at an elevated level. This results in the raising of a gravitational weight center which in turn may cause the loader to be kinetically unstable or to be turned over in the worst circumstances.

The loader described and shown in the Mather patent also has a problem calling for the provision of a relatively longer output shaft extending from the hydrostatic motor into the transmission case and the provision of bearing means for rotatably supporting the output shaft to prevent it from being bent or sagged by bending moments applied thereto particularly during actuation of a disk type brake device. This makes the drive system for a loader bulky and expensive.

The loader of the cited patent is further disadvantageous in that axle housings welded to the transmission case and stub axles journaled in the housings are not able to avoid a substantial increase in their length in order to meet the vehicle width requirement.

SUMMARY OF THE INVENTION

Accordingly, it is an object of the invention to provide a discrete drive system for a skid steer loader which is designed to lower the gravity center to produce a low vehicle profile and thus stabilize loading or running operation performed by the loader.

Another object of the invention is to provide a drive system for a skid steer loader comprising a brake device which includes a circular drum secured in place to the reduction gear, a flexible band wound circumferentially on the circular drum, and an actuation means pivotably journaled through an outer casing of the gear reduction means.

A further object of the invention is to provide a drive system for a skid steer loader in which an output shaft of the gear reduction means is coupled directly to a front or rear axle, rather than through any of the endless chains, thereby eliminating the need to have drive sprockets integrally formed with the output shaft and, consequently, simplifying the transmission cases in their internal configuration.

In one aspect of the present invention, there is provided a drive system for a skid steer loader which comprises: a main frame for the loader; a pair of parallelly spaced, elongated transmission cases integrally formed with the main frame for transmitting drive force from a hydrostatic motor to front and rear stub axles; means for interconnecting the bottom surfaces of the pair of transmission cases to define a longitudinally extending compartment, said compartment receiving at least partially an engine for the loader and a hydraulic pump; and gear reduction means mounted on the inner side wall of each of the transmission cases, said gear reduction means having a pair of drive sprockets operatively connected to driven sprockets on the stub axles.

In another aspect, the present invention contemplates a drive system for a skid steer loader which comprises: a main frame for the loader; a pair of parallelly spaced, elongated transmission cases integrally formed with the main frame for transmitting drive force from a hydrostatic motor to front and rear stub axles; means for interconnecting the bottom surfaces of the pair of transmission cases to define a longitudinally extending compartment, said compartment receiving at least partially an engine for the loader and a hydraulic pump; and gear reduction means mounted on the inner side wall of each of the transmission cases in axial alignment with either one of the front or rear stub axle to achieve a direct drive of the aligned axle.

The gear reduction means is provided with an outer casing rigidly secured to the inner side wall of the transmission cases, a first output shaft having an inner end extending into the transmission cases and a second output shaft associated with the hydrostatic motor. In this embodiment, the first output shaft is coupled directly to either one of the front or rear axle, rather than any of the endless chains, which has a sprocket to drive the non-coupled axle by use of a single endless chain.

Many other features, advantages and additional objects of the present invention will become manifest to those versed in the art in light of the following detailed description of the present invention with reference to the accompanying drawings.

DETAILED DESCRIPTION OF THE INVENTION

Figure 1:
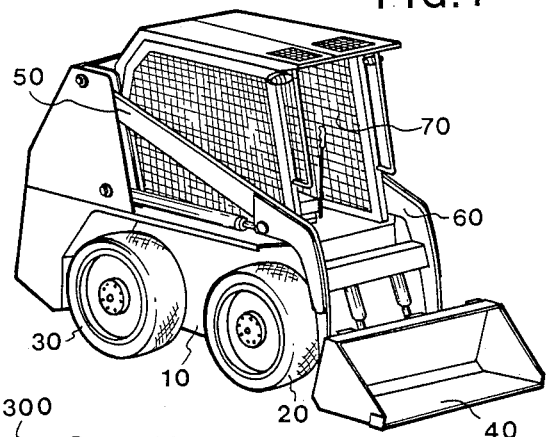
FIG. 1 is a perspective view of a skid steer loader incorporating the improved drive system of the present invention.

Referring now to the drawings wherein like reference characters designate like or corresponding parts throughout the several views, FIG. 1 illustrates the general construction of a skid steer loader incorporating the present invention.

As is shown in FIG. 1, the skid steer loader generally comprises a main frame 10, front and rear wheels 20 and 30, a bucket 40, an operating unit 70 and an engine not shown for simplicity. The front and rear wheels 20 and 30 are carried on the outer ends of the front and rear stub axles which are rotatably journaled in the axle housings of the main frame 10. The bucket 40 is pivotably articulated to the booms 50 and 60 to perform the loading operation in response to displacement of the hydraulic cylinders.

The detailed description of the general construction for a loader incorporating the present invention is made in close reference to the corresponding description made in the aforementioned U.S. Pat. No. 4,168,757 for the sake of convenience.

Figure 2A:
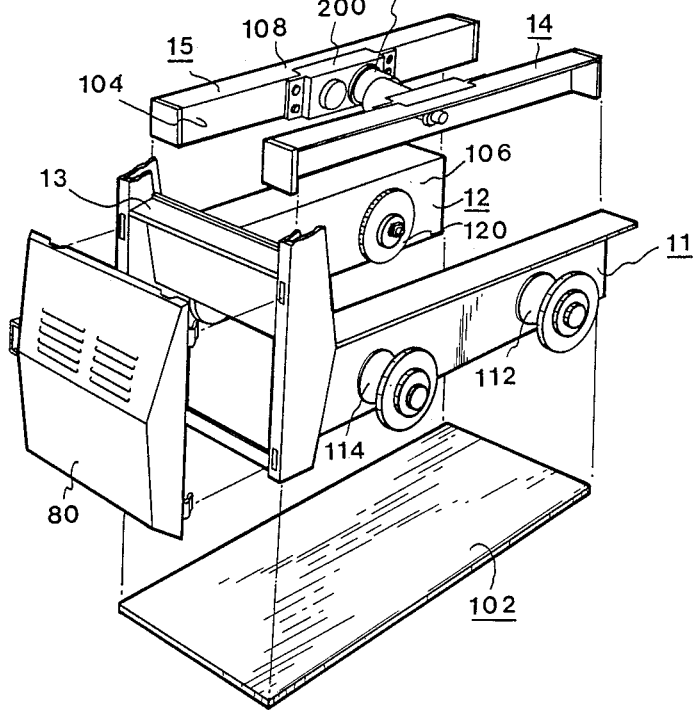
FIG. 2A is a partially exploded perspective view of the main frame of the skid steer loader showing major structural elements of the loader associated with the improved drive system as viewed from the rear thereof.
Figure 2B:
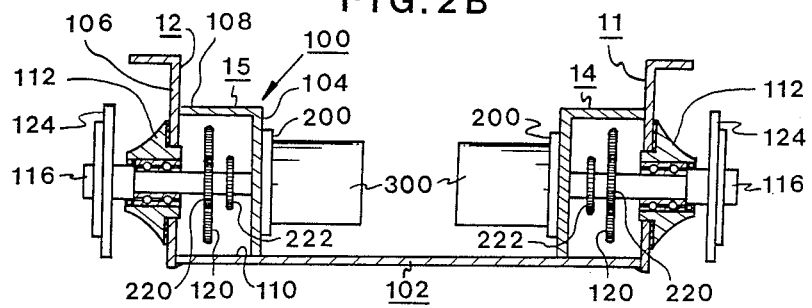
FIG. 2B is a cross-sectional view of the main frame associated with the novel drive system having a pair of transmission cases integrally formed with the side beams of the main frame.

FIG. 2A and FIG. 2B illustrate perspective and cross-sectional views of major structural elements of the loader comprising a general type of main frame associated with the novel drive system. The main frame is provided with a pair of laterally spaced longitudinally extending side beams 11 and 12 and a laterally extending cross beam 13 disposed at the rear of the side beams 11 and 12. A rear cover 80 is releasably attached to the cross beam 13 of the main frame.

Connection means 102 is secured to the lower ends of the side beams 11 and 12 by suitable securing means such as welding, thereby providing a base to accommodate an engine, hydraulic pumps and the like. As clearly shown in FIG. 2B, welded to the inner surfaces of the side beams 11 and 12 are a pair of right-angled covering plates 14 and 15, each of which includes an elongated vertical extension and a horizontal extension formed integrally with the vertical extension at a right angle. Onto the outer surfaces of the side beams 11 and 12, axle housings 112 and 114 are secured to rotatably journal the front and rear stub axles as is known in the art.

In such an arrangement, the pair of covering plates 14 and 15 are adapted to define a first and a second transmission cases 100 and 100 in cooperation with the side beams 11 and 12 serving as outer side walls and the connection means 102 serving as the bottom base of the transmission cases.

Figure 3:
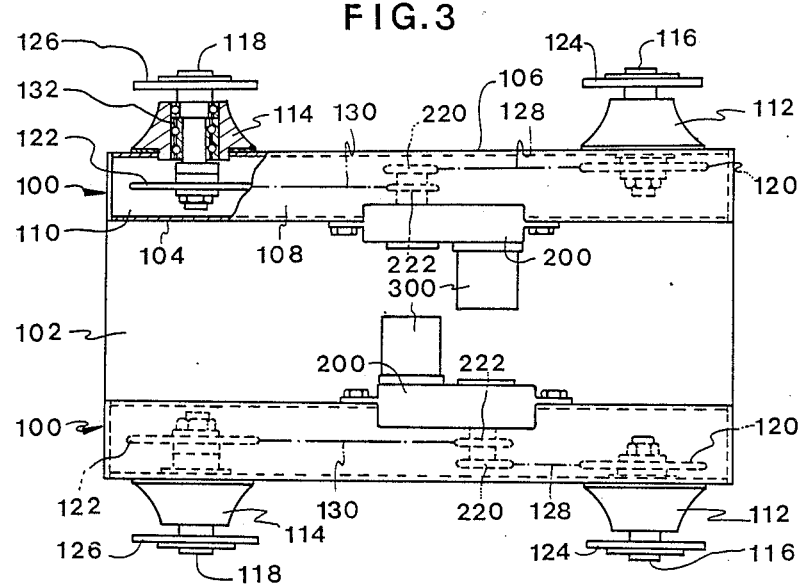
FIG. 3 is a top plan view showing an embodiment of the present drive system incorporating a pair of transmission cases which are spaced apart and interconnected by a plate member, the cases having portions thereof removed for clarity.

Referring to FIG. 3 which shows a particular embodiment of the present invention, the discrete drive system for a loader comprises a first and a second elongated transmission cases 100 and 100 containing therein endless chains and sprockets for power transmission. Connection means 102 is provided to rigidly interconnect the bottom portions of the first and the second transmission cases in a spaced relationship. It should be noted that connection means 102 may interconnect the side walls or top walls of the transmission cases when it is necessary. Mounted on the inner side walls of the transmission cases are a first and a second gear reduction means 200 and 200 which provide drive power to the front and rear axles at reduced speeds and enhanced torques. A first and a second hydrostatic motors 300 and 300 are coupled to each of the gear reduction means 200 and 200 as is known in the art.

It may be understood that the first and the second transmission cases are substantially the same in configuration as well as internal structure thereof. For the sake of convenience, only the first transmission case will be set forth hereinbelow in connection with the corresponding first gear reduction means and the first hydrostatic motor.

The first transmission case 100 is composed of an inner side wall 104 and an outer side wall 106 laterally spaced therefrom. A top wall 108 and a bottom wall 110 are welded to or integrally formed with the upper and lower ends of the side walls 104 and 106 to form a longitudinally extended transmission case into which is contained chain transmission means. Front and rear axle housings 112 and 114 outwardly extending from the outer side wall 106 include central bores through which are rotatably journaled front and rear stub axles 116 and 118 carrying drive sprockets 120 and 122 at their inner ends and wheel plates 124 and 126 at their outer ends.

As may be appreciated from FIG. 3, lateral spacing of the transmission cases 100 and 100 helps shorten the length of the axle housings 112 and 114 and the stub axles 116 and 118. This results in the cost effective fabrication and easier maintenance of the front and rear axles 116 and 118 journaled in the axle housings 112 and 114 through bearing means 132.

The bottom portion of the first transmission case 100 is rigidly connected to that of the second transmission case 100 by means of connection means 102 so that a compartment which is opened at its longitudinal ends may be formed between both transmission cases 100 and 100. While not exclusive in the present invention, connection means 102 may be a metal plate having sufficient stiffness to bear vertical loads and/or bending moments. The compartment is adapted to receive at least partially such main elements for the loader as an engine, hydraulic pumps, hydrostatic motors and the like which are conventionally mounted on a common transmission case at an elevated level. Thus, the overall height and gravity center of the loader may be considerably lowered to achieve a low vehicle profile and stable operation.

A first and a second gear reduction means 200 and 200 are mounted on the respective inner side wall 104 of the transmission cases 100 and 100. The first gear reduction means 200 includes an output shaft extending into the first transmission case 100 and carrying at the inner end thereof drive sprockets 220 and 222 which are operatively coupled to driven sprockets 120 and 122 through endless chains 128 and 130. Specifically, a first endless chain 128 connects the drive sprocket 220 to the driven sprocket 120 carried at the inner end of the front stub axle 116. The drive sprocket 222 is connected by a second endless chain 130 to the driven sprocket 122 carried at the inner end of the rear stub axle 118.

Hydrostatic motors 300 and 300 are mounted on the gear reduction means 200 and 200 to provide driving force to the gear reduction means. First and second pumps(not shown) are hydraulically connected by hoses to the first and the second hydrostatic motors 300 and 300.

Figure 4:
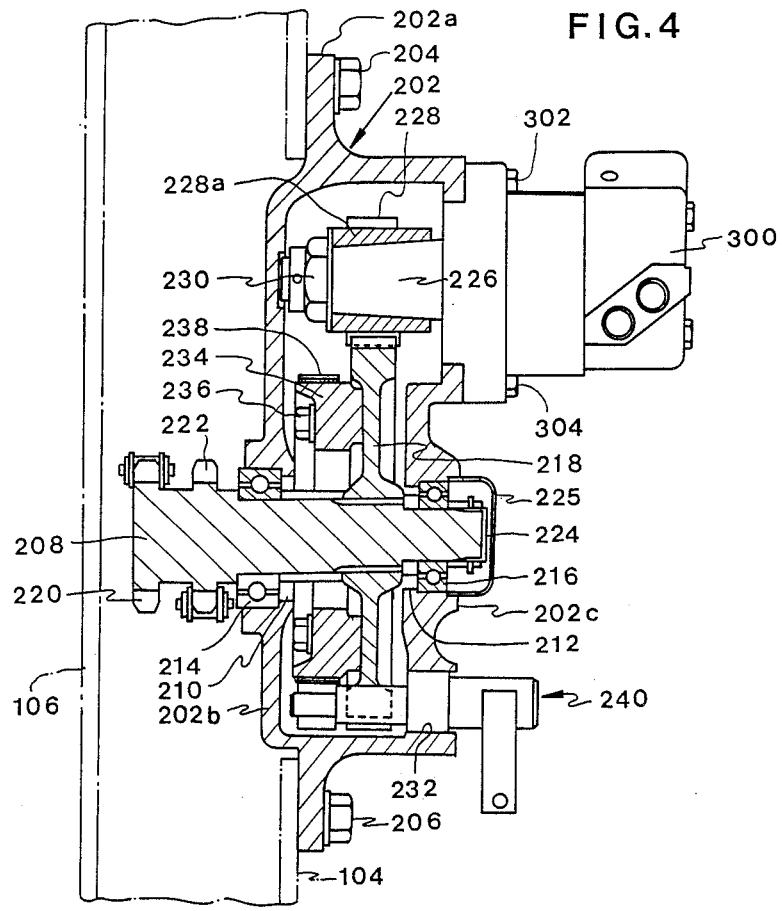
FIG. 4 is a plan view, partially in section, of the gear reduction means mounted on the inner side wall of the transmission cases, the gear reduction means incorporating a band brake means in place of the disk brake employed in the conventional loaders.

As best shown in FIG. 4, the first gear reduction means 200 is a generally elongated structure comprising an outer casing 202 secured to the inner side wall 104 of the first transmission case 100 by means of bolts 204 and 206 which extend through openings in the flange 202a of the outer casing 202 to engage complementary threaded openings in the inner side wall 104 of the transmission case 100. The outer casing 202 includes a first hub 210 formed on the forward wall 202b of the casing 202, a second hub 212 provided at the rear wall 202c in axial alignment with the first hub 210 and a third hub 232 parallel to the second hub 212.

Journaled in the first and the second hubs 210 and 212 is an output shaft 208 which is held in place by a retainer 224 and an end cap 225. First and second bearings 214 and 216 rotatably support the output shaft 208. The output shaft 208 has a reduction gear 218 mounted thereon and carries at its inner end drive sprockets 220 and 222 which are operatively connected to the driven sprockets carried on the front and rear axles through the first and second endless chains as set forth hereinabove.

Mounted adjacent to the second hub 212 is a hydrostatic motor 300 which is bolted on the outer casing 202 by bolts 302 and 304. An output shaft 226 of the hydrostatic motor 300 extends into the outer casing 202 in a decreased distance without protruding into the transmission case 100. The output shaft 226 is tapered and has a smallest diameter at its free end. Slidingly coupled to the output shaft 226 is a pinion gear 228 which is integrally formed with the boss member 228a having a central bore complementary to the tapered shaft 226. The pinion gear 228 is retained in place by a nut 230 engaging the stud of the output shaft 226 and is normally meshed with the reduction gear 218 of the output shaft 208.

Figure 5:
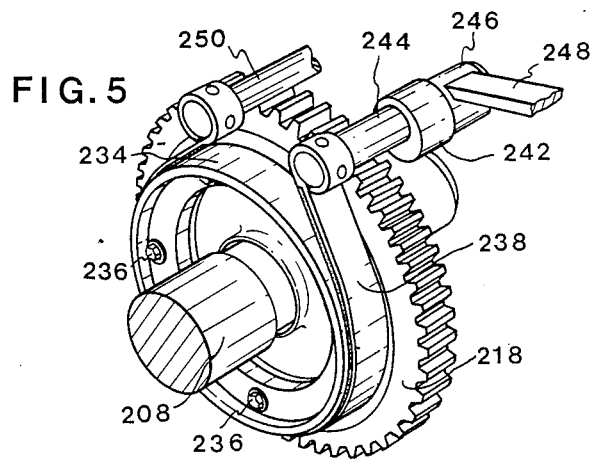
FIG. 5 is a partial perspective view illustrating the brake means of the present invention with portions thereof removed for clarity.

In accordance with the present drive system, brake means is incorporated in the gear reduction means 200 as shown in FIG. 4 and particularly in FIG. 5. The brake means comprises a circular drum 234 which is secured coaxially to one side of the reduction gear 218 by means of bolts 236 and 236. Circumferantially wound around the drum 234 is a flexible band 238, one end of which is tied on the support bar 250, the other end of which is held by tension means for applying tensile force to the flexible band 238.

The tension means comprises an eccentric cam shaft 240 pivotably mounted on the outer casing 202 of the gear reduction means 200. The eccentric cam shaft 240 includes a middle extension 242 journaled through the third hub 232 of the outer casing 202, an interior shank 244 eccentrically extending into the casing from the middle extension 242 to hold a terminal end of the flexible band 238, and an exterior shank 246 concentrically outwardly extending from the middle extension to affix an actuation lever 248 thereto.

It should be noted that the brake means may take the form of disk brake well known in the art, in which case the output shaft 226 of the hydrostatic motor 300 should be further extended into the transmission case 100 and a disk plate has to be attached to the free end of the output shaft 226.

Figure 6:
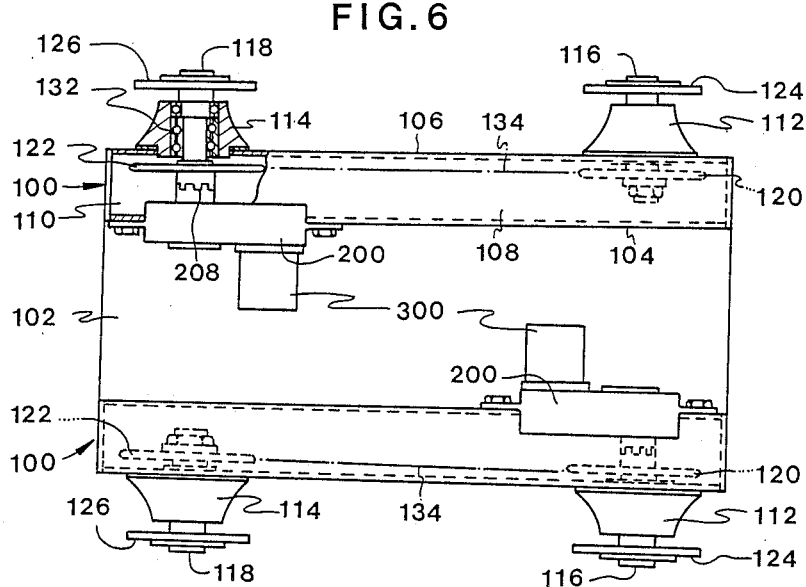
FIG. 6 is a similar view as depicted in FIG. 3, showing an alternative embodiment of the present drive system in which an output shaft of gear reduction means is coupled directly to the front or rear axle.

Referring now to FIG. 6, there is shown an alternative embodiment of the present drive system wherein a first and a second gear reduction means are mounted on the inner side walls of the transmission cases 100 and 100 so that the output shaft 208 may be axially aligned with the rear stub axle 118. The output shaft 208 has a toothed end which engages an array of teeth provided at the inner end of the rear stub axle 118 to directly drive the rear wheel. Coupling between the output shaft of the gear reduction means and the rear stub axle may be made by any of known type of coupling means such as a spline shaft or a serration.

In such an arrangement, the sprocket 122 carried on the rear axle 118 functions as a drive sprocket to rotate the driven sprocket 120 of the front axle 116 by use of a single endless chain 134. Therefore, there is no need to provide drive sprockets on the outer end of the output shaft 208; and only an endless chain is required to transmit the drive power to the respective driven axle.

While the output shafts of the first and second gear reduction means 200 and 200 have been shown in FIG. 6 as coupled to the rear and front stub axles respectively, they can, of course, be coupled in different manner without departing from the scope of the invention. For example, the output shaft of the first gear reduction means may be coupled to the front axle in the first transmission case whereas that of the second gear reduction means may be connected to the rear axle in the second transmission case. Alternatively, all of the output shafts of the reduction means may be coupled, if desired, to either the front axles or the rear axles in both transmission cases.

What is claimed is:

1. A discrete drive system for propelling a skid steer loader in different directions which comprises in combination:

a main frame including a pair of side beams and a cross beam;

a pair of parallelly spaced, elongated transmission cases integrally formed with the side beams of said frame for transmitting drive force from a hydrostatic motor to front and rear stub axles;

each of said transmission cases including an inner side wall, an outer side wall spaced apart from said inner side wall and tubular axle housings outwardly extending from said outer wall to rotatably support said stub axles, said inner side wall having an opening;

means for interconnecting connection said pair of transmission cases to define a longitudinally extending compartment, said compartment receiving at least partially an engine for the loader and a hydraulic pump;

gear reduction means mounted on the inner side wall of each of said transmission cases, said gear reduction means driving a pair of drive sprockets operatively connected to driven sprockets of said stub axles; and said gear reduction means including an outer casing rigidly secured to said inner side wall, a first output shaft having an outer end extending through said opening into said transmission case and a second output shaft associated with said hydrostatic motor, said first output shaft carrying a reduction gear mounted thereon, said second output shaft carrying a pinion gear parallelly spaced apart from said reduction gear, said reduction gear and said pinion gear operatively coupled with each other to drive said drive system at a reduced speed, said outer end of the first output shaft carrying said drive sprockets operatively connected to the driven sprockets on the stub axles through endless chains.

2. The drive system as in claim 1 wherein said connection means is a metal plate having sufficient stiffness to endure vertical loads and bending moments exerted thereon.

3. The drive system as in claim 1 which further comprises brake means, said brake means including a circular drum secured coaxially to one side of said reduction gear, a flexible band wound circumferentially around said drum, and means for tensioning the flexible band to exert braking force on said drum.

4. The drive system as in claim 4 wherein said tension means comprises an eccentric cam shaft pivotably mounted on the outer casing of said gear reduction means; and said cam shaft includes a middle extension journaled on the outer casing, an interior shank eccentrically extended into said casing from said middle extension to hold a terminal end of said flexible band, and an exterior shank concentrically outwardly extended from said middle extension to affix an actuation lever thereto.

5. The drive system as in claim 4 wherein said second output shaft has a length smaller than the width of the outer casing of said reduction means.

6. The drive system as in claim 5 wherein said second output shaft of the hydrostatic motor has a tapering shape and terminates at its threaded end, and wherein said pinion gear being axially mounted on said second output shaft and secured in position by a nut engaging with said threaded end.

7. A discrete drive system for propelling a skid steer loader in different directions which comprises in combination:

a main frame including a pair of side beams and a cross beam;

a pair of parallelly spaced, elongated transmission cases integrally formed with the side beams of said main frame for transmitting drive force from a hydrostatic motor to front and rear stub axles;

each of said transmission cases including an inner side wall, an outer side wall spaced apart from said inner side wall, and tubular axle housings outwardly extending from said outer side wall to rotatably support said stub axles, said inner side wall having an opening;

connection means for interconnecting said pair of transmission cases to define a longitudinally extending compartment;

gear reduction means mounted on the inner side wall of each of said transmission cases in axial alignment with either one of said front or rear stub axle to achieve direct drive of said aligned axle;

said gear reduction means including an outer casing rigidly secured to said inner side wall, a first output shaft having an outer end extending through said opening into said transmission cases so as to be coupled directly to said aligned stub axle and a second output shaft associated with said hydrostatic motor, said first output shaft carrying a reduction gear mounted thereon, said second output shaft carrying a pinion gear parallelly spaced apart from said reduction gear, said reduction gear and said pinion gear operatively coupled with each other; and said stub axle aligned and coupled to said first output shaft having a drive sprocket operatively connected through an endless chain to a driven sprocket on a non-coupled stub axle.

8. The drive system as in claim 7 wherein said first output shaft is coupled to the rear axle in one transmission case and to the front axle in the other transmission case, and vice versa.

9. The drive system as in claim 7 wherein said connection means is a plate member having sufficient stiffness to endure vertical loads and bending moments exerted thereon.

10. The drive system as in claim 7 which further comprises brake means, said brake means including a circular drum secured coaxially to one side of said reduction gear, a flexible band wound circumferentially around said drum, and means for tensioning the flexible band to exert braking force on said drum.

11. The drive system as claim 10 wherein said tension means comprises an eccentric cam shaft pivotably mounted on the outer casing of said reduction means; and said cam shaft includes a middle extension journaled on the outer casing, an interior shank eccentrically extending into said casing from said middle extension to hold a terminal end of said flexible band, and an exterior shank concentrically outwardly extending from said middle extension to affix an actuation lever thereto.

12. The drive system as in claim 7 wherein said second output shaft of the hydrostatic motor has a tapering shape and terminates at its threaded end, and wherein said pinion gear being axially mounted on said second output shaft and secured in position by a nut engaging with said threaded end.

* * * * *